(No Model.)

E. M. CRANE.
OSCILLATING DEVICE FOR VEHICLES.

No. 513,765. Patented Jan. 30, 1894.

Witnesses
Severance
C. C. Hines

Inventor
Edward M. Crane
by Mason Fenwick Lawrence
his Attorneys

UNITED STATES PATENT OFFICE.

EDWARD M. CRANE, OF OSHKOSH, WISCONSIN.

OSCILLATING DEVICE FOR VEHICLES.

SPECIFICATION forming part of Letters Patent No. 513,765, dated January 30, 1894.

Application filed April 25, 1893. Serial No. 471,790. (No model.)

*To all whom it may concern:*

Be it known that I, EDWARD M. CRANE, a citizen of the United States, residing at the city of Oshkosh, in the county of Winnebago and State of Wisconsin, have invented certain new and useful Improvements in Oscillating Devices for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in oscillating devices for all vehicles having a front transverse elliptical spring.

I am aware that oscillating devices have heretofore been used but the body of the vehicle has always been attached above or on top of the spring. As illustrations of a body attached on a plane above the spring, reference is here made to Letters Patent Nos. 305,643 and 461,016,—as with respect to said patents my invention is especially designed as an improvement. Recently there has been an increased demand for vehicles with low hung bodies, and the objects of my improvements are, first, to provide an oscillating device for vehicles with low hung bodies or where the body of the vehicle is hung between the springs, and, second, to lower the point of oscillation or pivotal support as near the axle as possible.

Figure 1:
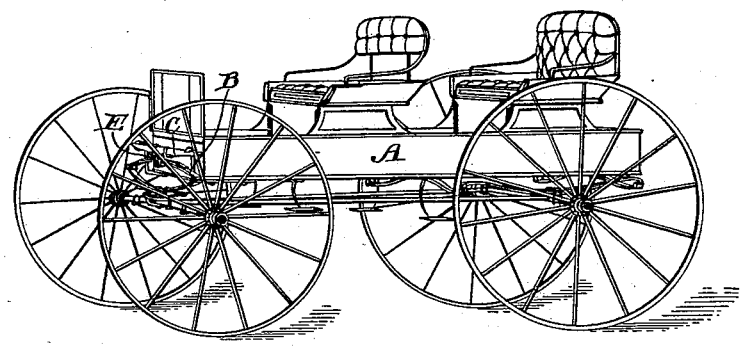
Figure 2:
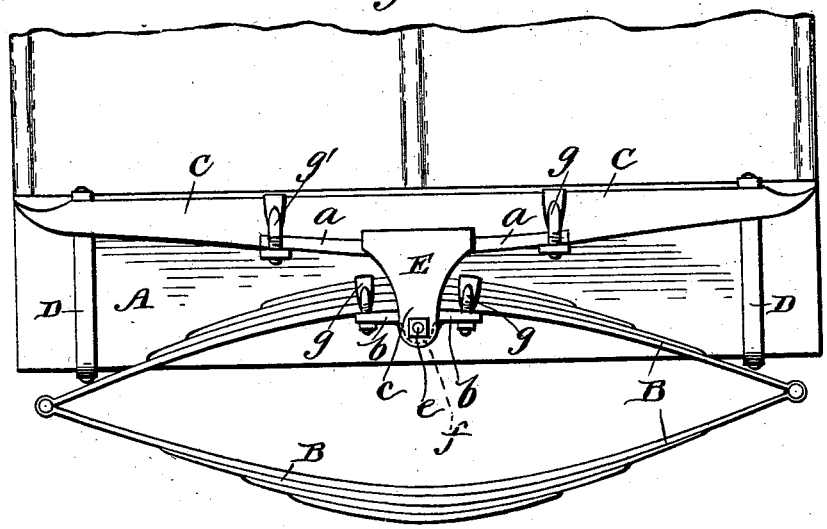
Figure 3:
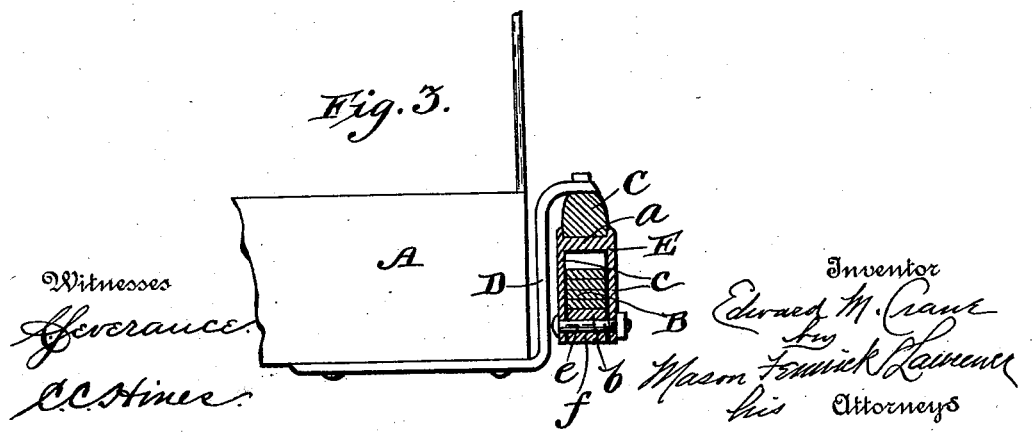

In the accompanying drawings, Figure 1 is a perspective view of a vehicle provided with my invention. Fig. 2 is a front view of the oscillating device, and Fig. 3 is a side view and vertical section of the oscillating device.

A in the drawings is the body and B the spring of the vehicle.

C is an ordinary cross bar, and D D body loops connecting the body A with the bar C. This manner of attaching the body to the spring is used in all so called "end spring" vehicles for the purpose of hanging the body low, but in vehicles of this description heretofore constructed the spring B has been rigidly attached to the bar C. In my invention the bar C is rigidly attached to a bifurcated pendent connecting and guiding device E, which consists of a channeled top plate $a$ clipped at $g$, $g'$ to the bar C, two dependent arms $c$, $c$ integral therewith, and a bottom plate $b$ which is smooth on top and formed with a downwardly depending lug $f$ at its middle or center, and in the lug an eye is formed for the passage of a bolt $e$, said plate forming a pivotal support or means of oscillation. The plate $a$ is clipped at $g'$, $g'$ to the bar C and the plate $b$ to the under side of the top half of the spring, the whole construction serving for bringing the pivotal bearing as low as practicable.

It is advisable to construct the under side of the bar C and the plate $a$ convex upon an arc similar to the arc of the upper half of the spring so that the spring and bar may be near together and still leave space for oscillation.

In the operation of my device, when one wheel of the vehicle passes over an obstruction or into a depression, my oscillating device permits of the axle and spring tilting without molesting the body of the vehicle and, as both the body and the pivotal support are low, the center of gravity is correspondingly low, practically below the point of support, and swaying of the body is thereby prevented.

What I claim as my invention is—

The combination with the front cross bar C of a vehicle, of the front spring B, the bifurcated pendent connecting and guiding device E provided with a top plate $a$ by which it can be clipped to the said cross bar, the front spring B having the leaves of its upper half arranged between the jaws or prongs of the said connecting and guiding device, the bottom plate $b$ on which the upper half of the spring bears and by which said upper half of the spring can be clipped to the said connecting device, and the pivot $e$ passed through the connecting and guiding device E and through the plate at a point below the said half of the spring and on which the axle can oscillate without disturbing the body of the vehicle, substantially as described.

In testimony whereof I affix my signature in presence of two witnesses.

EDWARD M. CRANE.

Witnesses:
CLARENCE TURCK,
MAUD MURRAY.